Patented Jan. 4, 1927.

1,612,857

UNITED STATES PATENT OFFICE.

EDWARD F. DONNELLY, OF MALDEN, MASSACHUSETTS.

BALL-COCK VALVE.

Application filed August 15, 1925. Serial No. 50,370.

This invention relates to a ball cock valve, and has for its object to provide a valve of the character mentioned capable of operating with equal efficiency when employed in connection with either high or low pressure water systems, said valve also being capable of acting as a pressure relief for the water system when the pressure of the latter becomes excessive.

Another object of the invention is to provide a valve of cheap and simple construction, there being a minimum number of parts employed, and all of said parts being easily accessible and easily and quickly assembled, the valve seat for the movable valve member being located within a coupling for a pipe fitting which is clamped to the extremity of the valve casing and also acting as a washer to render the coupling tight.

It is still further an object of the invention to so construct the valve seat and portion of the movable valve member which engages therewith that dirt and other foreign matter cannot collect thereon and cause the valve to leak.

The invention consists in the combination and arrangement of parts set forth in the following specification and particularly as pointed out in the claim thereof.

Referring to the drawings:—

Like numerals refer to like parts throughout the several views of the drawings.

Figure 1:
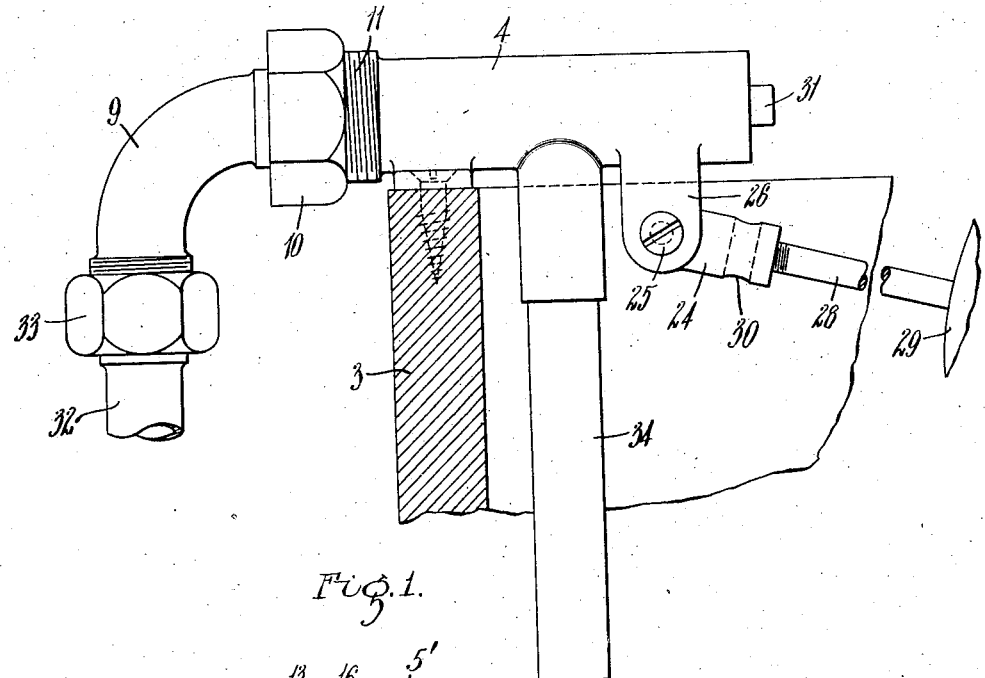
Figure 1 is a side elevation of a ball cock valve embodying my invention, the same being illustrated mounted upon a tank which is broken away to save space in the drawings.

In the drawings, 3 represents a portion of a flush tank, upon the upper edge of which is mounted a valve casing 4. The valve casing 4 has a cylindrical bore 5 extending longitudinally therethrough for its entire length, and said bore 5 is of the same diameter throughout said entire length and forms a valve chamber 6 within said casing. A plurality of grooves 5' are provided in the wall of the chamber 6 extending longitudinally thereof. At one of its ends the valve casing 4 is open at 7 and at an intermediate point said valve casing has a discharge passsage 8 formed therein which communicates with the valve chamber 6. The other end of the valve casing 4 constitutes an entrance end of the casing, and has a pipe fitting 9 clamped thereto by a coupling 10, the latter having screw-threaded engagement with an external screw thread 11 provided upon said casing. The coupling 10 has a shouldered portion 12 formed thereon which engages with a shouldered portion 13 formed upon the pipe fitting 9 and said shouldered portion 13 of said pipe fitting and a valve seat member 14 which is located within the coupling 10 are clamped in unison by said coupling against the extremity of the valve casing 4. The valve seat member 14 is preferably constructed of leather and has a port 15 extending therethrough and a tapered valve seat 16 formed thereon adapted to be engaged by a movable valve member 17, the latter being formed in a single piece and having a conical shaped end portion 18 formed upon a head 19, and said conical portion 18 fits closely within the seat portion 16 and thereby closes the inlet port 15. The diameter of the head portion 19 is relatively less than the diameter of the cylindrical bore 5, thereby providing a space around said head through which water may pass in entering the valve chamber 6. The valve member 17 also embodies therein a portion 20 at the opposite end thereof from the head portion 19, and the diameter of said portion 20 is such that it will be an easy sliding fit within the bore 5.

Located between the portions 19 and 20 of the movable valve member 17 is a reduced portion 21. The portion 20 of the movable valve member 17 is slotted at 22 to receive a head portion 23 of a float lever 24, said lever being pivoted at 25 between a pair of arms 26 that project downwardly from the valve casing 4. The float lever 24 is screw-threaded at 27 to receive the end portion of a rod 28, at the outer extremity of which a float 29 of well known construction is mounted. The float lever 24 is also provided with a hole 30 extending transversely thereof which is adapted to be utilized in holding another form of float rod of well known construction. A portion 31 of the movable valve member 17 projects through the open end 7 of the valve casing 4 and is utilized in removing said valve member from said casing. An inlet pipe 32 is connected to the pipe fitting 9 by a union 33 of well known construction and a discharge pipe 34 is connected to the valve casing 4 communicating with the discharge passage 8, said pipe 34 discharging the water from the valve chamber 6 at a point adjacent to the bottom of the flush tank 3 in a manner well known to those skilled in the art.

Figure 2:
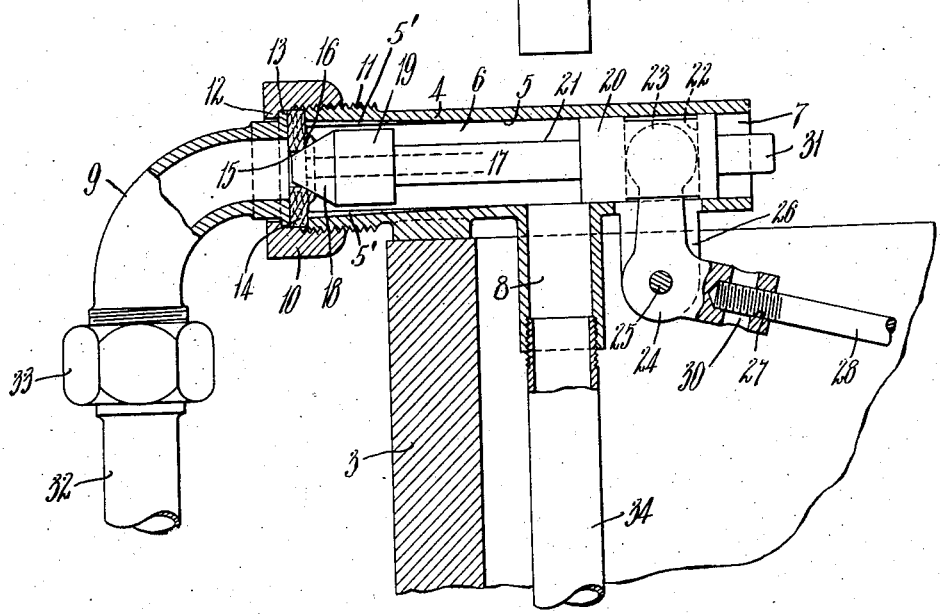
Fig. 2 is a central, vertical, longitudinal section through the valve.

The general operation of my improved ball cock valve is as follows:—When the flush tank 3 is filled with water to a predetermined high level, the float 29 will be raised and the float lever 24 will be located in a position as illustrated in Fig. 2 holding the movable valve member 17 in its closed position with the conical portion 18 of the head 19 seated tightly against the valve seat 16 and closing the inlet port 15. When, however, the water within the tank 3 has been drawn therefrom in a manner well known to those skilled in the art, the float 29 drops as the level of the water falls and the float lever 24 will rock upon its pivot 25 and withdraw the movable valve member 17 from its seat 16, allowing water to enter the valve chamber 6 and pass therefrom through the discharge passage 8 and discharge pipe 34 into the tank. The head portion 19 of the movable valve member 17 is so shaped that particles of foreign matter that may be in the water system will not become deposited thereon and thereby clog the valve.

The valve of this invention is so constructed that it will work with equal efficiency upon either low or high pressure water systems, but if the pressure of the water within the system becomes excessive and reaches a danger point, said valve is so constructed that it will automatically operate to allow the water to pass therethrough into the flush tank 3 and thereby relieve the pressure within the system.

In removing the movable valve member 17 from the casing 4, all that is necessary is to remove the pivot screw 25, withdraw the head portion 23 of the lever 24 from said movable valve member, grasp the end portion 31 and pull said valve member outwardly from the casing. The valve seat member 14 is also constructed and arranged in such a manner as to be utilized as a washer in rendering the coupling 10 for the pipe fitting 9 tight.

I claim:—

A ball cock valve comprising, in combination, a casing having a cylindrical bore of uniform diameter extending entirely therethrough provided with a plurality of longitudinal grooves at the entrance end thereof, said casing also having a discharge passage communicating with said bore, a coupling adapted to secure a pipe fitting to said casing, a valve seat member located within said coupling and having a port extending therethrough and a tapered seat portion formed thereon, said valve seat member adapted to be clamped against an extremity of said casing by said coupling and constituting a washer therefor, a movable valve member within said bore formed in a single piece and closing the open end thereof, said valve member being provided with a central reduced portion and having a head at one end thereof provided with a tapered extremity adapted to engage said seat, and a float lever pivotally mounted upon the exterior of said casing and projecting thereinto and engaging said movable valve member whereby the latter may be actuated to open and close said inlet port.

In testimony whereof I have hereunto set my hand.

EDWARD F. DONNELLY.